United States Patent Office 3,459,964
Patented Aug. 5, 1969

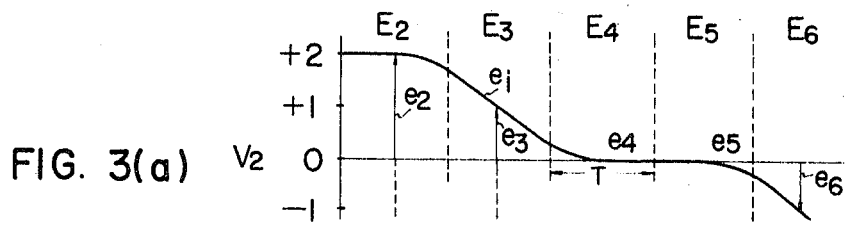
FIG. 3(a)
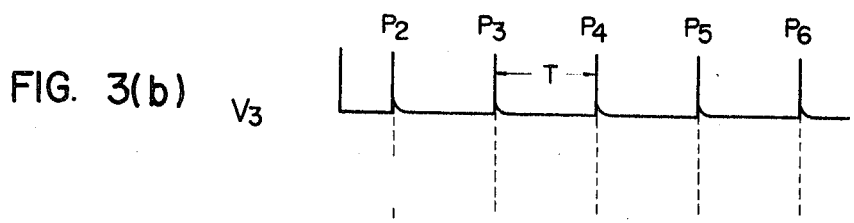
FIG. 3(b)
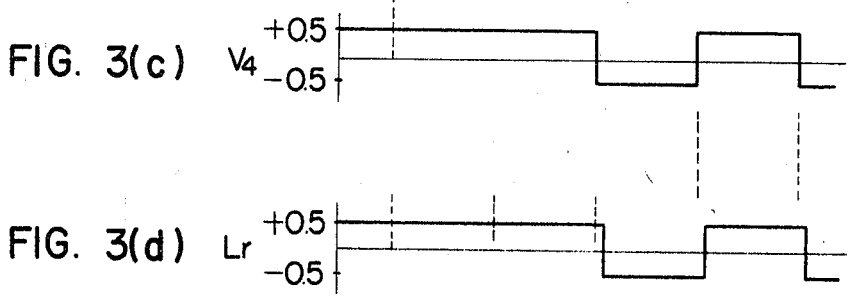
FIG. 3(c)
FIG. 3(d)
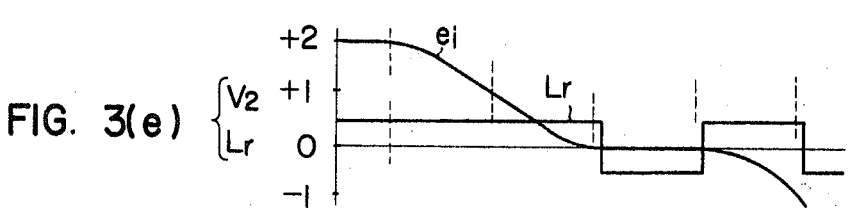
FIG. 3(e)
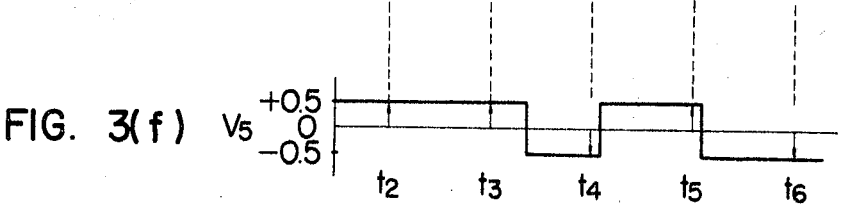
FIG. 3(f)

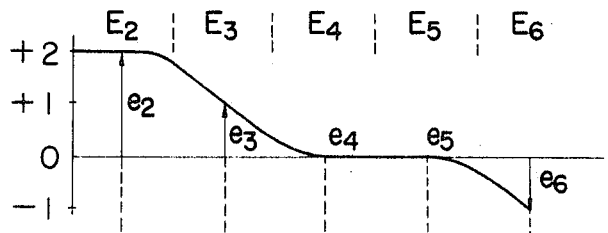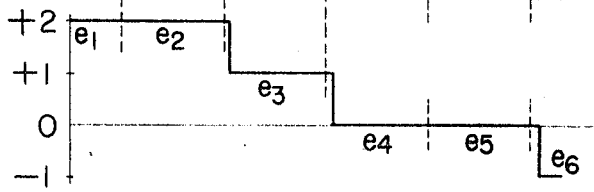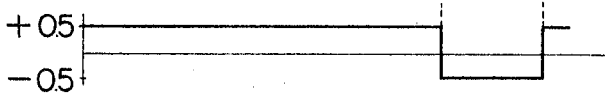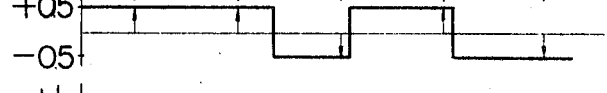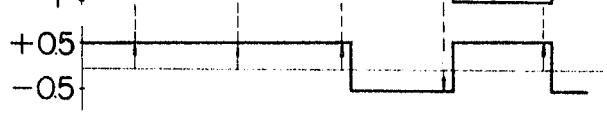

3,459,964
DETECTING SYSTEM FOR A TRANSMITTED
TELEGRAPH SIGNAL
Kazuo Yoshida, 188 3-chome, Koenji, Suginami-ku, and
Shinsuke Fukiage, 1125 Matsunoki-cho, Suginami-ku,
both of Tokyo-to, Japan
Filed Jan. 20, 1966, Ser. No. 521,871
Claims priority, application Japan, Jan. 25, 1965,
40/3,651
Int. Cl. H03k 5/20
U.S. Cl. 307—236                                    5 Claims

ABSTRACT OF THE DISCLOSURE

A detecting system for a telegraph signal transmitted through a telegraph pass-band narrower than twice the highest telegraph modulation frequency of the telegraph signal by use of a level detector for detecting the polarity of the difference between a level of each code element of the transmitted telegraph signal and a reference level, where the reference level is deviated upwardly or downwardly so as to assume one of two possible predetermined levels in accordance with the polarity of only the just preceding code element detected by the level detector. Alternatively, the reference level may be determined so as to assume one of three possible levels in accordance with the detected polarity of the just preceding code element and the previously detected polarity of the just succeeding code element.

---

Figure 1A:
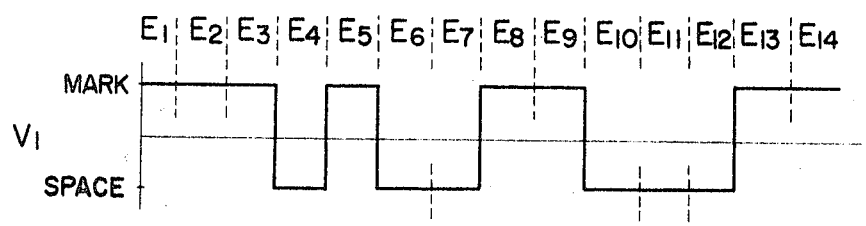

This invention relates to a detecting system for a transmitted telegraph signal, more particularly to a system applicable for detecting the polarity of a telegraph signal transmitted through a telegraph pass-band narrower than twice the highest telegraph modulation frequency of the signal.

In conventional systems for detecting whether the polarity of each code element of a transmitted telegraph signal is plus (mark) or minus (space), the zero level of the transmitted signal is employed as its reference level, and detection of the polarity is carried out in accordance with whether the instantaneous level of the transmitted signal is higher or lower than the reference level. Such a detection system operates correctly for detecting a telegraph signal transmitted through a relatively wide pass band, but incorrectly for a telegraph signal transmitted through a relatively narrow pass band. More particularly in the case of such a relatively narrow pass band, side-band components of the transmitted telegraph signal are attenuated through the pass band, whereby the instantaneous level of the transmitted telegraph signal does not trace along its proper course, and the proper instantaneous level deviates in accordance with the polarity of the just preceding code element and/or the just succeeding code element. The conventional detecting system has such disadvantages as decrease of effective margin, difficulty of polarity-detection or increase of miss-detection.

An object of this invention is to provide a detection system for a telegraph signal transmitted through a telegraph pass-band narrower than twice the highest telegraph modulation frequency of the signal.

According to the present invention there is provided a detecting system for a transmitted telegraph signal, comprising a level detector for detecting the polarity of difference between a level of each code element of the transmitted telegraph signal and a reference level, the level detector producing an output signal representative of the polarity detected, and characterized in that the reference level ($L_r$) is deviated upwardly or downwardly in accordance with the detected polarity of the just preceding code element. By this combination, the reference level is determined at a suitable value in accordance with the polarity of the just preceding code element. Furthermore, the reference level can be determined at a suitable value in accordance with polarity of the just preceding and just succeeding code elements.

Figure 1B:
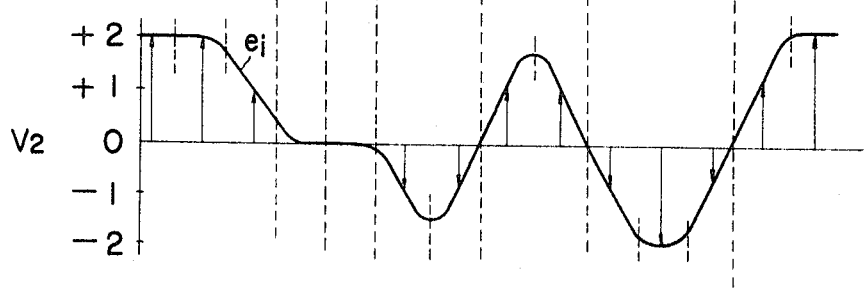
Figure 1C:
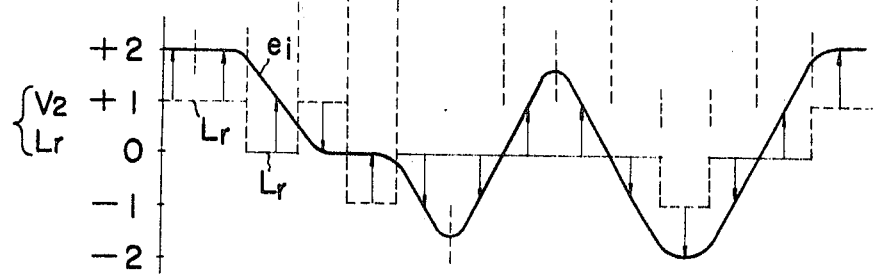
Figure 2:
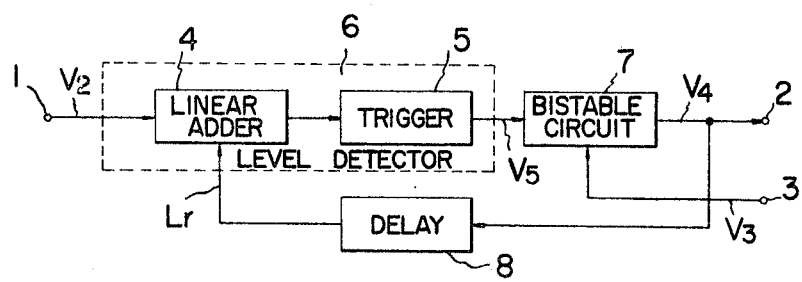
Figure 5:
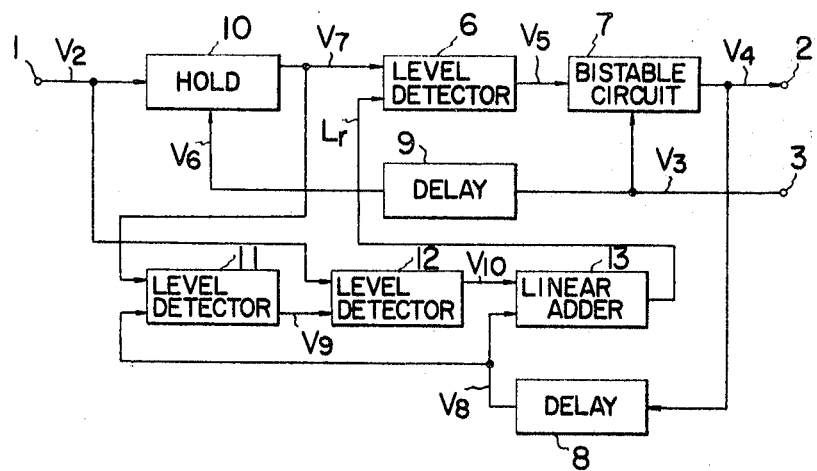
Figure 4:
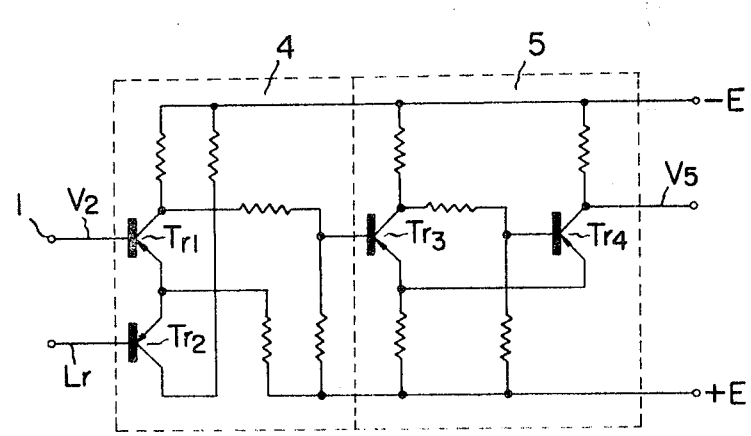
Figure 6:
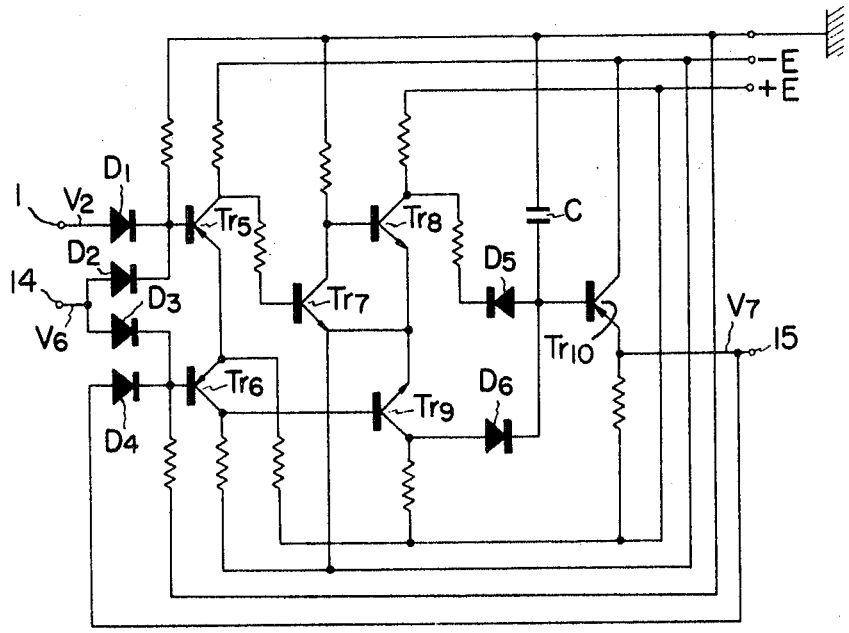

The novel features of this invention are set forth with particularity in the appended claims. This invention, however, as to its construction and operation together with advantages thereof, may best be understood by reference to the following description, taken in connection with the accompanying drawings in which the same or equivalent parts are designated by the same or similar reference numerals or characters, and in which:

FIGS. 1(a), 1(b) and 1(c) show waveforms for describing the principle of this invention;

FIGS. 2 and 5 are respectively block diagram of embodiments of this invention;

FIGS. 3(a) through 3(f) are waveforms for explaining the operation of the embodiment shown in FIG. 2;

FIGS. 4 and 6 are, respectively, connection diagrams of a level detector and a hold means employed in the embodiment of this invention; and FIGS. 7(a) through 7(j) are waveforms for explaining the operation of the embodiment shown in FIG. 5.

Referring to FIGS. 1(a), 1(b) and 1(c), the principle of this invention will first be described. It is assumed that a telegraph signal $V_1$ of W Bauds (the frequency of the code element is $W/2$ cycle/second) is transmitted through a telegraph pass band narrower than ($W/2$) cycle/second and received, as a wave $V_2$. In an actual telegraph transmission channel, the telegraph signal is delayed by a proper time, but the delay time is neglected in FIG. 1 for simplicity of illustration. The magnitudes of the arrows shown indicate the instantaneous levels of the transmitted telegraph signal, respectively, corresponding to code elements. As observable from the waveforms $V_1$ and $V_2$, the level $e_i$ of the wave $V_2$ corresponding to mark (or space) code element assumes different values as the case may be. In other words, if mark level and space are respectively assumed to be (+2 volts (v.)) and (−2 v.) (this assumption is similarly applied hereinafter), the level of the wave $V_2$ corresponding to a mark (or space) code element assumes different values (for example, 0 v., +1 v., +2 v.; or 0 v., −1 v., −2 v.) in accordance with the polarity or polarities of the just preceding code element and/or the just succeeding code element. In the conventional detecting system, zero level is employed as the reference level. Accordingly, the code elements $E_4$ and $E_5$ are miss-detected since the instantaneous level $e_i$ of the wave $V_2$ is zero irrespective of the mark or space polarity of the code elements $E_4$ and $E_5$. It is understood that the reference level fixed at zero is not suitable for correctly detecting the transmitted telegraph signal $V_2$. In order to establish the reference level at a suitable value, it is necessary to precisely study the characteristic of the instantaneous level $e_i$.

It is at first understood that different levels corresponding to mark (or space) code element occur under the influence of polarities of the just preceding and/or the just succeeding code elements. For example, when the just preceding and the just succeeding code elements are mark, the instantaneous level $e_i$ corresponding to a mark code element is established at (+2 v.). When one of the preceding and succeeding code elements is mark and the other is space, the level $e_i$ corresponding to a mark code element is established at a value (+1 v.). Moreover, when both of the just preceding and the succeeding code elements are mark, the level $e_i$ corresponding to a mark code element is established at a value (0 v.). Said conditions are shown in table.

TABLE

| | Polarity of the just preceding code element | Polarity of the just succeeding code element | The level $e_i$ of a code element to be detected (v.) | |
|---|---|---|---|---|
| | | | Mark code element | Space code element |
| (1) | Mark | Mark | +2 | 0 |
| (2) | do | Space | +1 | −1 |
| (3) | Space | Mark | +1 | −1 |
| (4) | do | Space | 0 | −2 |

In above table, the level $e_i$ of the code element to be detected, where the instant code element is space, is also shown.

As observable from the table, the difference between the level $e_i$ corresponding to a mark code element and the level $e_i$ corresponding to a space code element always assumes a value (2 v.) for all combinations (1), (2), (3) and (4) of polarity of the just preceding code element and the just succeeding code element. However, the level $e_i$ deviates in accordance with the combination (1), (2), (3) or (4).

In this invention, the reference level is not fixed but is deviated so as to establish, for each code element, a suitable value in accordance with said combination (1), (2), (3) and (4) of polarity. It is observed from table above that values (+1 v.), (0 v.) and (−1 v.) are, respectively, suitable for the reference level (L$r$) for said combinations (1), (2), (3) and (4). If such reference levels (L$r$) are established for each code element, the level detection margin of (1 v.) is assured in all cases. FIG. 1(c) shows the relationship between the wave $V_2$ and the reference level L$r$ established as described above. Each of the dotted arrows shown in FIG. 1(c) indicates said level detection margin (1 v.) for the instaneous level ($e_i$) of each code element.

If the characteristic of the transmission channel is stable, and it is allowable to reduce said level detection margin, the reference level (L$r$) can be established in accordance with only the polarity of the just preceding code element. In combinations (1) and (2) in each of which the polarity of the just preceding code element is mark, the level $e_i$ of the code element to be detected assumes a value (+2 v.) or (+1 v.) with respect to "mark" and a value ((0 v.) or (−1 v.)) with respect to "space." Accordingly, when the reference level is established at a value (+0.5 v.), the level detection margin of (0.5 v.) is assured for both of the combinations (1) and (2) irrespective of the "mark" or "space" polarity of the code element to be detected. On the other hand, in the case of combinations (3) and (4) in each of which the polarity of the just preceding code element is "space," the level $e_i$ of the code element to be detected assumes a value ((+1 v.) or (0 v.)) with respect to "mark" and a value ((−1 v.) or (−2 v.)) with respect to "space." Accordingly, when the reference level is established at a value (−0.5 v.), the level detection margin of (0.5 v.) is assured for both of the combinations (3) and (4) irrespective of the "mark" or "space" polarity of the code element to be detected.

Referring to FIGS. 2, 3(a) to 3(f), and 4, an embodiment of this invention in which the reference level L$r$ is established in accordance with only the polarity of the just preceding code element will now be described. This embodiment shown in FIG. 2 comprises a level detector 6, a bistable circuit 7, and a delay means 8. The level detector 6 detects the polarity of the difference $d_1$ between a level $e_i$ of each code element of the transmitted telegraph signal and a reference level L$r$. The transmitted telegraph signal is applied through a terminal 1. As a result of level detection, the detector 6 produces an output signal $V_5$ which has a predetermined level and a plus or minus polarity in accordance with the polarity of said difference $d_1$. The polarity (plus or minus) of its output voltage (e.g.; 0.5 v.) is determined in accordance with the polarity of the signal $V_5$ at every pulse ($P_1$, $P_2$, $P_3$, . . .) of a sampling pulse signal $V_3$. The period of this pulse signal $V_3$ applied through a terminal 3 is equalized with the duration of the code element of the transmitted signal $V_2$, and its phase position is shifted, by one half of the duration of the code element, from the instant of transmission of each code element of the signal $V_2$. The output $V_4$ of the bistable circuit 7 is delayed, by a time slightly longer than the duration of said sampling pulses ($P_1$, $P_2$, . . .), in a delay circuit 8. The output of the delay circuit 8 is applied, as the reference level L$r$, to the level detector 6.

The level detector 6 is composed of a linear adder 4 and a trigger circuit 5. FIG. 4 shows an example of the level detector 6, in which transistors $Tr_1$ and $Tr_2$ form the linear adder 4, and transistors $Tr_1$ and $Tr_2$ form the trigger circuit 5. The collector potential of the transistor $Tr_1$ is controlled by the resultant voltage of linear adding of the transmitted signal $V_2$ on the reference level L$r$ and is applied to a Schmitt trigger circuit formed by the transistor $Tr_3$ and $Tr_4$. The Schmitt trigger is so arranged that its output polarity changes when either one of the instantaneous level $V_2$ (i.e. $e_i$) and the reference level L$r$ exceeds the other. Accordingly, when the level $e_i$ ($V_2$) exceeds the reference level L$r$, the output $V_5$ assumes plus polarity. On the other hand, the output $V_5$ assumes minus polarity when the level L$r$ exceeds the level $e_i$ ($V_2$).

The operation of the embodiment shown in FIG. 2 will now be described with reference to FIGS. 3(a), 3(b), 3(c), 3(d), 3(e), and 3(f) which correspond, respectively, to the transmitted wave $V_2$, the sampling pulse $V_3$, the output $V_4$ of the bistable circuit 7, the reference level L$r$, the wave $V_2$ and the reference level L$r$ superposed on each other, and the output $V_5$ of the level detector 6. In this description, it will be disclosed how the polarity of code element $E_4$ is detected in the embodiment shown in FIG. 2. Before the time $t_4$ when the sampling pulse $P_4$ corresponding to the code element $E_4$ is applied, the level of the output $V_4$ and the reference level L$r$ assume a value (+0.5 v.) because the just preceding code element $E_3$ is detected, as "mark" polarity, at a time $t_3$. On the other hand, the instantaneous level $e_i$ at the time $t_4$ corresponds to an instantaneous level $e_4$ of the code element $E_4$. As shown in FIG. 3(e), since the reference level L$r$ exceeds the level $e_4$ at the time $t_4$, the polarity of the output $V_5$ assumes a value (−0.5 v.). At this time $t_4$, mentioned above, the sampling pulse $P_4$ is applied so as to cause the bistable circuit 7 to detect the polarity of code element $E_4$, thereby to detect it as "space" polarity. At the time $t_5$, the reference level L$r$ assumes a value (−0.5 v.) since the just preceding code element $E_4$ has been detected as "space," and an instantaneous level $e_5$ is zero. The polarity of the code element $E_5$ is detected as "mark" polarity because the level $e_5$ exceeds the level L$r$.

As mentioned above, the instantaneous level $e_i$ of the transmitted signal $V_2$ corresponding to respective code elements ($E_1$, $E_2$, . . . $E_i$ . . .) are compared with the reference level L$r$ determined in accordance with the polarity of the just preceding code element, whereby the polarity of code elements are successively detected. Detected information is derived through the output terminal 2. In this operation, it can be considered that the bistable circuit 7 and the delay means 8 are also employed as means for delaying the output $V_5$ by a time equal to or slightly longer than the duration T of the code element.

FIG. 5 shows another embodiment of this invention in which the reference level L$r$ is determined by the use of the polarity of the just preceding code element and the just succeeding code element. Terminals 1, 2 and 3, the level detector 6, the bistable circuit 7, and the delay circuit 8 are respectively equivalent to those described with reference to FIGS. 2, 3 and 4. This embodiment is further provided with a hold means 10, a second level detector 11, a third detector 12, a linear adder 13, and a delay means 9. The hold means 10 is employed for sampling a level ($e_1$) of each code element and holding sampled level ($e_1, e_2, e_3, \ldots e_i \ldots$) until the sampling of the just succeeding code element. The second level detector 11 detects the polarity of the differences $d_2$ between the level $e_1$ (i.e. $V_7$) held by the hold means 10 and a provisional reference level $V_8$, thereby producing an output signal $V_9$ which has a predetermined level and a plus or minus polarity in accordance with the polarity of the difference $d_2$. The third detector 12 detects the polarity of the difference $d_3$ between the level $e_1$ of each code element of the transmitted telegraph signal $V_2$ and the output signal $V_9$ of the second level detector 11, thereby producing an output signal $V_{10}$ which has a predetermined constant level and a plus or minus polarity in accordance with the polarity of the difference $d_3$. The linear adder 13 is employed for superposing the output signal $V_{10}$ of the third level detector 12 on the reference level $Lr$. Moreover, the delay means 8 has a delay time less than the duration T of the code element. In an actual case, this delay time is selected so as to be slightly longer than the duration of the sampling pulses ($P_1, P_2, P_3, \ldots$).

In this embodiment, the polarity of the each code element is detected at a time when the just succeeding code element is received. The second level detector 11 previously detects the polarity of the instant code element by comparing the level held in the hold means 10, with the provisional reference level $V_8$. The third level detector 12 previously detects the polarity of the just succeeding code element by comparing the output $V_9$ of the detector 11 with the transmitted telegraph signal $V_2$. Accordingly, the detector 12 produces the output $V_{10}$, which is the result of previously detecting the just succeeding code element. This output $V_{10}$ and the provisional reference level $V_8$ which is the result of detecting the just preceding code element are linearly superposed in the linear adder 13, whereby the reference level $Lr$ is determined in accordance with the polarity of the just preceding code element and the just succeeding code element.

Referring to FIGS. 7($a$) to 7($j$), the operational principle whereby the polarity of the code element $E_4$ is detected in the embodiment shown in FIG. 5 will now be described. Before a time $t_5$ when the output $V_4$ assumes a value (+0.5 v.), the just preceding code element $E_3$ is detected as "mark." Accordingly, the provisional reference level $V_8$ also assumes a value (+0.5 v.). On the other hand, the hold means 10 holds, at the time $t_5$, the instantaneous level $e_4$ ($V_7$) of the just preceding code element $E_4$. Since the level $V_7$ is zero volt (0 v.), and the provisional reference level $V_8$ is a value (+0.5 v., the output $V_9$ of the detector 11 assumes a value (−0.5 v.). In this operation, the instant code element $E_4$ is previously detected as "space." At the same time $t_5$, the level detector 12 compares the level $e_5$ (=0 v.) of the just succeeding code element with the output level (−0.5 v.) of the detector 11, whereby the just succeeding code element is detected as "mark," and the output $V_{10}$ of the detector 11 assumes a values (+0.5 v.). By superposing the output $V_{10}$ (=+0.5 v.) on the provisional reference level $V_8$ (=+0.5 v.), the reference level $Lr$ (=+1 v.) is obtained. This reference level ($Lr$=+1 v.) corresponds to that of the combination (3) shown in the table. In this cacse, the level detector 6 compares the level ($V_7$−$e_4$−0 v.) with the reference level ($Lr$=+1 v.), whereby the instant code element $E_4$ is detected as "space." According to such an operation, all elements are successively detected.

In the embodiment shown in FIG. 5, the hold means 10 is further shown in detail. FIG. 6 shows an example of the hold means 10. Transistors $Tr_5$ and $Tr_6$ form a differential amplifier for linearly superposing the signal ($V_2$) applied from the terminal 1 on the signal $V_7$ applied from a terminal 15. Negative pulses $V_6$ supplied from a terminal 14 pass through diodes $D_2$ and $D_3$ and are applied to the bases of the transistors $Tr_5$ and $Tr_6$. Accordingly, tthe differential amplifier ($Tr_5$ and $Tr_6$) operates at every pulse signal $V_6$ ($P_1', P_2' \ldots$ in FIG. 7($c$)).

A transistor $Tr_8$ and a diode $D_5$ form a discharging circuit for a capacitor C. A transistor $Tr_9$ and a diode $D_6$ form a charging circuit as the capacitor C. A transistor $Tr_{10}$ constitutes an output amplifier. Either of the discharging circuit or the charging circuit operates at every phase signal ($P_1', P_2', \ldots$) so as to equalize the levels of the signal $V_2$ and the signal $V_7$. The sampled level is charged in the capacitor C and held until application of the just succeeding sampling pulse.

As mentioned above, the system of this invention is suitable for detecting a telegraph signal transmitted through a telegraph pass-band narrower than twice the highest modulation frequency of the signal, whereby it is capable of reducing miss-detected erroneous characters. In other words, the information capacity of a transmission pass-band can be increased in a condition of a constant number of erroneous characters. According to this invention, telegraph channels of more than 50 Bauds (bit/second) each of which is transmitted by a frequency with a frequency-deviation of (±30 cyclo/second) can be allocated at every frequency space (120 cycle/second). In such a condition, the modulation frequency cannot be increased over 50 bits/second for a conventional system, whereas it can be increased over twice 50 bits/second for the system of this invention. An example of practical test of the embodiment of this invention in such a condition is as follows. When the modulation frequency is 123 bits/second and the pass-band width is 120 cycles/second, an error rate of ($1 \times 10^{-6}$) is obtained. In the same condition, the error rate obtained by a conventional system is about ($2 \times 10^{-2}$). It is easily seen that a remarkable effect is obtainable according to this invention.

A telegraph signal transmitted through any transmission system as well as a telegraph signal transmitted by frequency modulation, for example, transmission by amplitude modulation or D-C transmission, can be completely regenerated by the regeneration system of this invention.

What we claim is:

1. A detecting system for a telegraph signal transmitted through a telegraph pass-band narrower than twice the highest telegraph modulation frequency of the telegraph signal, comprising a level detector for detecting the polarity of the difference between a level of each code element of the transmitted telegraph signal and a reference level, means for producing the reference level which is deviated upwardly or downwardly so as to assume one of predetermined two possible levels in accordance with the polarity of only the just preceding code element detected by the level detector, whereby the polarity of respective code elements of the transmitted telegraph signal are successively detected by the level detector.

2. A detecting system for a telegraph signal transmitted through a telegraph pass-band narrower than twice the highest telegraph modulation frequency of the telegraph signal, comprising a level detector for detecting the polarity of the difference between a level of each code element of the transmitted telegraph signal and a reference level, the level detector producing an output signal which has a predetermined level and a plus or minus polarity in accordance with the polarity of said difference, and a delay means for delaying, by a delay time equal to or slightly longer than the duration of the code element, the output signal of the level detector and for applying the output signal delayed, as the reference level, to the level detector, whereby the polarity of respective code elements of the transmitted telegraph signal are successively detected by the level detector.

3. A system according to claim 2, in which the delay means comprises a bistable circuit and a delay circuitry and means for supplying to said bistable circuit sampling pulses the period of which is equalized with the duration of the code element and the phase position of which is shifted by one half the duration of the code element from the instant of transmission of the code element, the state of the bistable circuit being determined, at each sampling pulse, in accordance with the polarity of the output signal of the level detector, the delay circuitry delaying, by a time less than the duration of the sampling pulse, the output of the bistable circuit.

4. A detecting system for a telegraph signal transmitted through a telegraph pass-band narrower than twice the highest telegraph modulation frequency of the telegraph signal, comprising a level detector for detecting the polarity of the difference between a level of each code element of the transmitted telegraph signal and a reference level, means for producing the reference level which is deviated upwardly or downwardly so as to assume one of three predetermined possible levels in accordance with the detected polarity of the just preceding code element and the previously detected polarity of the just succeeding code element, whereby the polarity of respective code elements of the transmitted telegraph signal are successively detected by the level detector.

5. A detecting system for a telegraph signal comprising: hold means for sampling a level of each code element of the transmitted telegraph signal and for holding said sampled level until sampling of the just succeeding code element; a first level detector for detecting the polarity of the difference $d_1$ between a level of each code element of the output signal of the hold means and a reference level, the level detector producing an output signal which has a predetermined level and a plus or minus polarity in accordance with the polarity of said difference $d_1$; delay means for delaying, by a delay time equal to or slightly longer than the duration of the code element, the output signal of the first level detector, whereby the delay means produces a provisional reference level; a second level detector for detecting the polarity of the difference $d_2$ between the level held by the hold means and the provisional reference level, thereby producing an output signal which has a predetermined level and a plus or minus polarity in accordance with the polarity of the difference $d_2$; a third level detector for detecting the polarity of the difference $d_3$ between the level of each code element of the transmitted telegraph signal and the output signal of the second level detector, thereby producing an output which has a predetermined level and a plus or minus polarity in accordance with the polarity of difference $d_3$, and means for superposing the output signal of the third level detector on the provisional reference level, whereby the reference level is derived from the last mentioned means, and the polarity of the respective code element is detected, by the first level detector, when the just succeeding code element is received.

References Cited

UNITED STATES PATENTS

| 2,721,308 | 10/1955 | Levy | 332—11 |
| 2,724,740 | 11/1955 | Cutler | 178—43.5 |
| 3,225,216 | 12/1965 | Grabowski | 307—88.5 |
| 3,283,320 | 11/1966 | Blachowicz et al. | 340—347 |
| 3,319,170 | 5/1967 | Harmer | 328—55 |

ARTHUR GAUSS, Primary Examiner

R. C. WOODBRIDGE, Assistant Examiner

U.S. Cl. X.R.

307—231, 235; 328—34, 115, 118, 146